United States Patent
Jochim et al.

(10) Patent No.: US 12,013,691 B2
(45) Date of Patent: Jun. 18, 2024

(54) METHOD AND SYSTEM FOR PERFORMING VEHICLE COMPUTING TASKS IN A REMOTE COMPUTING SYSTEM OR A VEHICLE

(71) Applicant: GM Global Technology Operations LLC, Detroit, MI (US)

(72) Inventors: Markus Jochim, Troy, MI (US); Fan Bai, Ann Arbor, MI (US); Bo Yu, Troy, MI (US); Yuchen Zhou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 17/847,596

(22) Filed: Jun. 23, 2022

(65) Prior Publication Data

US 2023/0418285 A1    Dec. 28, 2023

(51) Int. Cl.
*G05D 1/00* (2024.01)
*H04L 12/00* (2006.01)
*H04W 4/40* (2018.01)
*H04W 24/02* (2009.01)

(52) U.S. Cl.
CPC ........... *G05D 1/0022* (2013.01); *H04L 12/00* (2013.01); *H04W 4/40* (2018.02); *H04W 24/02* (2013.01)

(58) Field of Classification Search
CPC ....... G05D 1/0022; H04L 12/00; H04W 4/40; H04W 24/02
See application file for complete search history.

(56) References Cited

U.S. PATENT DOCUMENTS

| | | | |
|---|---|---|---|
| 10,887,808 B1* | 1/2021 | McPhee | H04W 16/14 |
| 2014/0200036 A1* | 7/2014 | Egner | H04W 8/245 |
| | | | 455/456.3 |
| 2017/0272972 A1* | 9/2017 | Egner | H04L 47/2441 |
| 2019/0215670 A1* | 7/2019 | Ameixieira | H04W 48/18 |
| 2019/0220703 A1* | 7/2019 | Prakash | G06V 10/95 |
| 2020/0178198 A1* | 6/2020 | Ding | H04W 60/04 |
| 2022/0110018 A1* | 4/2022 | Jha | H04W 28/0289 |
| 2023/0072769 A1* | 3/2023 | Yeh | H04W 28/0858 |
| 2023/0074288 A1* | 3/2023 | Filippou | H04W 28/0236 |

* cited by examiner

*Primary Examiner* — Phutthiwat Wongwian
*Assistant Examiner* — Susan E Scharpf
(74) *Attorney, Agent, or Firm* — Vivacqua Crane, PLLC

(57) ABSTRACT

A method for performing a plurality of vehicle computing tasks includes determining the plurality of vehicle computing tasks that need to be performed and monitoring a wireless connectivity between a vehicle and a remote computing system. Monitoring the wireless connectivity between the vehicle and the remote computing system includes measuring, in real time, at least one quality of service (QoS) measurement of the wireless connectivity between the vehicle and the remote computing system. The method further includes determining whether to perform at least one of the plurality of vehicle computing tasks in at least one of the remote computing system or a vehicle controller of the vehicle based on at least one QoS measurement.

20 Claims, 3 Drawing Sheets

METHOD AND SYSTEM FOR PERFORMING VEHICLE COMPUTING TASKS IN A REMOTE COMPUTING SYSTEM OR A VEHICLE

INTRODUCTION

The present disclosure relates to a system and method for performing vehicle computing tasks in a remote computing system or a vehicle depending on the quality of the wireless connectivity between the vehicle and the remote computing system.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles are wirelessly connected to a remote computing system, such as a cloud server or an edge server. However, the cloud or edge hosted functionality becomes unavailable to the vehicle when wireless connectivity degrades or stops. It is therefore desirable to monitor the wireless connectivity between the vehicle and the remote computing system to determine when remote computing system may perform vehicle computing tasks.

SUMMARY

The presently disclosed system and method use cold standby backup processes on vehicles to enable execution of primary processes for required vehicle functions on cloud/edge servers. Further, the system uses standby processes on vehicles for functions with less demanding latency requirements. The system therefore saves energy during normal operation when the vehicle-to-cloud/edge server connectivity is available, thereby extending vehicle range. Also, the system uses quality of service (QoS) measurements to adaptively adjust the frequency/content of system state information and/or the allocation of active processes to the vehicle or a cloud/edge server. The criteria for executing processes on the vehicle versus the cloud/edge servers are driven by QoS measurements and/or energy use and environmental aspects. A process may be either a primary process or a backup process. The process is considered primary if we want that process to be active during normal operation. The presence of the normal operation mode is determined by the QoS measurements and/or energy use and environmental aspect. We consider a process to be a backup process if we want that process to be "cold standby" during normal operation. At any point in time, a process can be either "active" or "cold standby" and that role can change over time depending on the quality of service of the communication system.

In an aspect of the present disclosure, the method for performing vehicle computing tasks includes determining a plurality of vehicle computing tasks that need to be performed and monitoring a wireless connectivity between a vehicle and a remote computing system. Monitoring the wireless connectivity between the vehicle and the remote computing system includes measuring, in real time, at least one quality of service (QoS) measurement of the wireless connectivity between the vehicle and the remote computing system. The method further includes determining whether to perform at least one of the plurality of vehicle computing tasks in at least one of a remote computing system or a vehicle controller of the vehicle based on at least one QoS measurement and performing at least one of the plurality of vehicle computing task in at least one of the remote computing system or the vehicle controller in response to determining to perform at least one of the plurality of vehicle computing tasks in at least one of the remote computing system or the vehicle controller of the vehicle. The method described in this paragraph improves vehicle technology by extending a vehicle battery range when the vehicle computing tasks are performed by the remote computing system.

In an aspect of the present disclosure, there are a plurality of QoS measurements. The plurality of QoS measurements includes a plurality of link-level QoS measurements and a plurality of path-level QoS measurements.

In an aspect of the present disclosure, the plurality of link-level QoS measurements includes a link packet-drop ratio, a link delay, a link jitter, and a link throughput. The plurality of path-level QoS measurements includes a path packet-drop ratio, a path delay, a path jitter, and a path throughput.

In an aspect of the present disclosure, monitoring the wireless connectivity between the vehicle and the remote computing system includes determining that there is no wireless connectivity between the vehicle and the remote computing system.

In an aspect of the present disclosure, determining whether to perform at least one of the plurality of vehicle computing tasks in at least one of the remote computing system or the vehicle controller of the vehicle based on at least one QoS measurement includes determining to perform all of the plurality of vehicle computing tasks in the vehicle controller in response to determining that there is no wireless connectivity between the vehicle and the remote computing system.

In an aspect of the present disclosure, monitoring the wireless connectivity between the vehicle and the remote computing system includes determining a QoS indicator of the wireless connectivity between the vehicle and the remote computing system.

In an aspect of the present disclosure, the method further includes determining that the QoS indicator of the wireless connectivity between the vehicle and the remote computing system is equal to or less than a predetermined connectivity threshold. Determining whether to perform at least one of the plurality of vehicle computing tasks in at least one of the remote computing system or the vehicle controller of the vehicle based on at least one QoS measurement includes determining to perform at least one of the plurality of vehicle computing tasks in the vehicle controller and another one of the plurality of vehicle computing tasks in the remote computing system in response to determining that the QoS indicator of the wireless connectivity between the vehicle and the remote computing system is equal to or less than the predetermined connectivity threshold.

In an aspect of the present disclosure, monitoring the wireless connectivity between the vehicle and the remote computing system includes determining that the QoS indicator of the wireless connectivity between the vehicle and the remote computing system is equal to or greater than a predetermined connectivity threshold.

In an aspect of the present disclosure, determining whether to perform at least one of the vehicle computing tasks in the remote computing system or the vehicle controller of the vehicle based on at least one QoS measurement includes determining to perform all of the plurality of vehicle computing tasks in the remote computing system in response to determining that the QoS indicator of the wireless connectivity between the vehicle and the remote computing system is equal to or greater than the predetermined connectivity threshold.

In an aspect of the present disclosure, performing at least one of the plurality of vehicle computing task in at least one of the remote computing system or the vehicle controller includes performing all of the plurality of vehicle computing tasks in the remote computing system in response to determining that the QoS indicator of the wireless connectivity between the vehicle and the remote computing system is equal to or greater than the predetermined connectivity threshold.

In an aspect of the present disclosure, the plurality of vehicle computing tasks includes positioning and mapping, perception, machine learning, and vehicle-to-infrastructure (V2X) sensing. These computing task are merely non-limiting examples.

In an aspect of the present disclosure, the plurality of QoS measurements includes plurality of link-level QoS measurements. At least one of the link-level QoS measurements is a link packet drop ratio. The link packet drop ratio is calculated using a following equation:

$$\tilde{P}(t) = \alpha \times P(t) + (1-\alpha) \times \tilde{P}(t-1)$$

where:
t is time;
P(t) is a new packet drop ratio measurement at sample time t;
$\tilde{P}(t-1)$ is an exponential-average packet drop ratio at time t−1;
$\tilde{P}(t)$ is an exponential-average packet drop ratio at time t; and
α is a weighting factor.

The present disclosure also describes a system for performing vehicle computing tasks. In an aspect of the present disclosure, the system includes a vehicle including a vehicle controller and a remote computing system including a server controller. The server controller is configured to be in wireless communication with the vehicle controller. The vehicle controller is programmed to determine a plurality of vehicle computing tasks that need to be performed and monitor a wireless connectivity between a vehicle and a remote computing system by measuring, in real time, at least one quality of service (QoS) measurement of the wireless connectivity between the vehicle and the remote computing system. The vehicle controller is programmed to determine whether to perform at least one of the plurality of vehicle computing tasks in the remote computing system or the vehicle controller based on at least one QoS measurement and either perform at least one of the plurality of vehicle computing tasks or command the server controller of the remote computing system to perform at least one of the vehicle computing tasks in response to determine to perform at least one of the plurality of vehicle computing tasks in the remote computing system or the vehicle controller. The system described in this paragraph improves vehicle technology by extending a vehicle battery range when the vehicle computing tasks are performed by the remote computing server.

In an aspect of the present disclosure, there are a plurality of QoS measurements. The plurality of QoS measurements includes a plurality of link-level QoS measurements and a plurality of path-level QoS measurements. The plurality of link-level QoS measurements include a link packet drop ratio, a link delay, a link jitter, and a link throughput for each link between the vehicle and the remote computing system. The plurality of path-level QoS measurements includes a path packet-drop ratio, a path delay, a path jitter, and a path throughput.

In an aspect of the present disclosure, the vehicle controller is programmed to determine that there is no wireless connectivity between the vehicle and the remote computing system using the plurality of QoS measurements.

In an aspect of the present disclosure, the vehicle controller is programmed to perform all of the plurality of vehicle computing tasks in response to determining that there is no wireless connectivity between the vehicle and the remote computing system.

In an aspect of the present disclosure, the vehicle controller is programmed to determine a QoS indicator of the wireless connectivity between the vehicle and the remote computing system.

In an aspect of the present disclosure, the plurality of vehicle computing tasks includes a first vehicle computing task and a second vehicle computing task, and the vehicle controller is programmed to compare the QoS indicator with a predetermined connectivity threshold to determine whether the QoS indicator is equal to or less than the predetermined connectivity threshold. The vehicle controller is further programmed to determine that the QoS indicator is equal to or less than the predetermined connectivity threshold and, in response to determining that the QoS indicator is equal to or less than the predetermined connectivity threshold, perform the first vehicle computing task. The server controller of the remote computing system is programmed to perform the second vehicle computing task in response to determining that the QoS indicator is equal to or less than the predetermined connectivity threshold.

In an aspect of the present disclosure, the vehicle controller is programmed to compare the QoS indicator with a predetermined connectivity threshold to determine whether the QoS indicator is greater than the predetermined connectivity threshold and determine that the QoS indicator is greater than the predetermined connectivity threshold. The server controller of the remote computing system is programmed to perform all of the plurality of vehicle computing tasks in response to determining that the QoS indicator is greater than the predetermined connectivity threshold.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description

DETAILED DESCRIPTION

Figure 1:
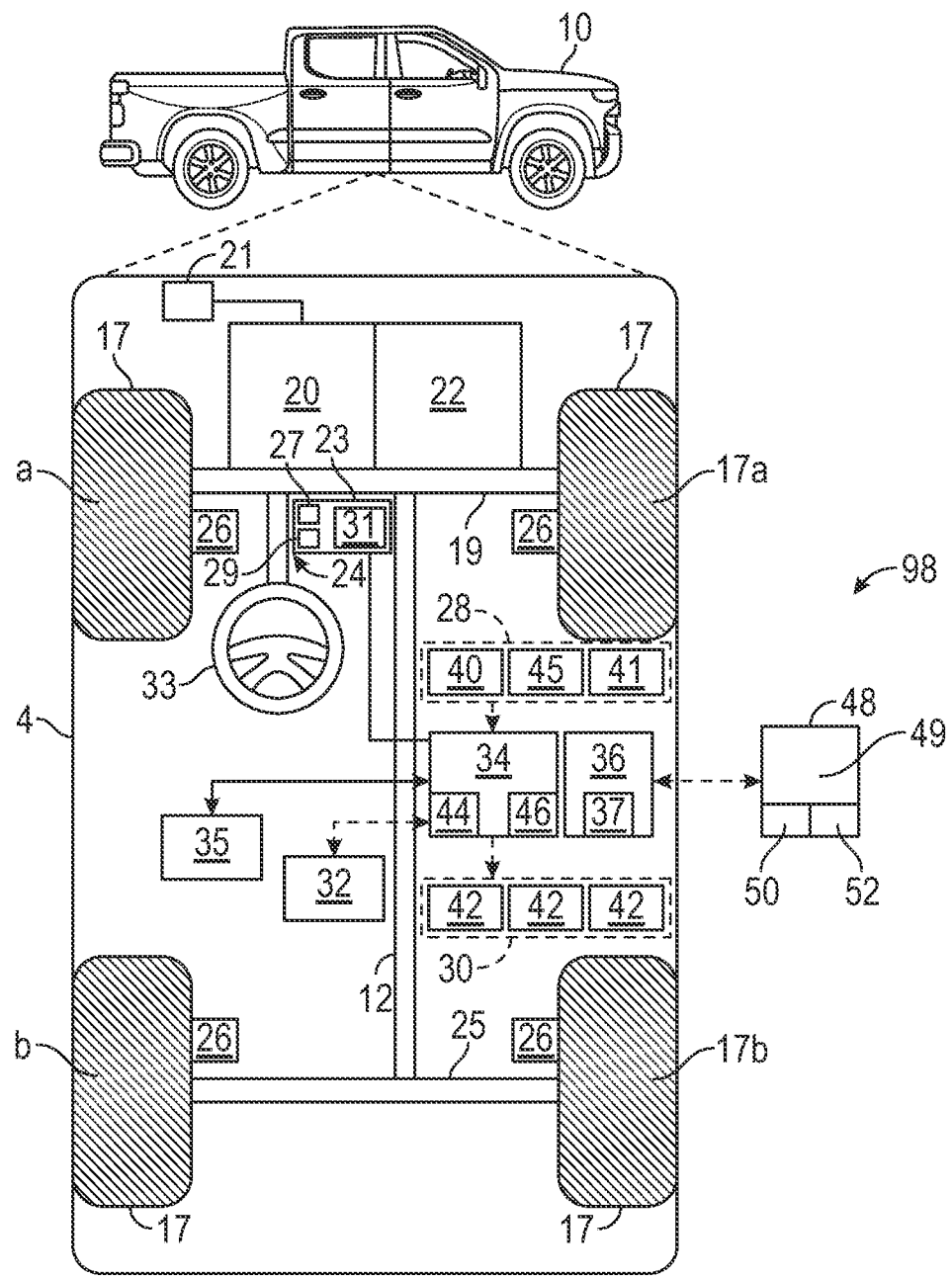
FIG. 1 is a schematic diagram of a system for performing vehicle computing tasks, wherein the system includes a vehicle and a remote computing system.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b. The vehicle 10 may be an electric vehicle.

In various embodiments, the vehicle 10 may be an autonomous vehicle and may be part of a system 98 for performing vehicle computing tasks. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one vehicle controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more Global Navigation Satellite System (GNSS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the vehicle controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the vehicle 10 in the globe. The GNSS transceiver 45 is in electronic communication with the vehicle controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The vehicle 10 may further include one or more airbags 35 in communication with the vehicle controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force.

The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 of the vehicle 10 may be programmed to execute a method 100 (FIG. 2) as described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single vehicle controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the vehicle controller 34 are embodied in the control system 98. The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the vehicle controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the vehicle controller 34 is configured to receive inputs from the user via the user interface 23.

The communication system 36 is in communication with the vehicle controller 34 and is configured to wirelessly communicate information to and from other remote computing system 48, such as remote systems at a remote call center (e.g., ON-STAR by GENERAL MOTORS). The remote computing system 48 may be a cloud computing system or an edge computing system. In certain embodiments, the communication system 36 may be a wireless communication system configured to communicate via a wireless local area network (WLAN) using IEEE 802.11 standards or by using cellular data communication (e.g., 5G communications) with the remote computing system 48. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

The remote computing system 48 is configured to be in wireless communication with the vehicle controller 34 and includes a server controller 49. The server controller 49 includes at least one server processor 50 and a server non-transitory computer readable storage device or media 52. The server processor 50 may be a custom-made processor, a central processing unit (CPU), a graphics processing unit (GPU), an auxiliary processor among several processors associated with the server controller 50, a semiconductor-based microprocessor (in the form of a microchip or chip set), a macroprocessor, a combination thereof, or generally a device for executing instructions. The server computer readable storage device or media 52 may include volatile and nonvolatile storage in read-only memory (ROM), random-access memory (RAM), and keep-alive memory (KAM), for example. KAM is a persistent or non-volatile memory that may be used to store various operating variables while the server processor 50 is powered down. The server computer-readable storage device or media 52 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the server controller 50 in controlling the vehicle 10. The server controller 49 may be programmed to execute a method 100 (FIG. 2) as described in detail below.

The instructions may include one or more separate programs, each of which comprises an ordered listing of executable instructions for implementing logical functions. The instructions, when executed by the server processor 50, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms.

Although a single server controller 49 is shown in FIG. 1, embodiments of the system 98 may include a plurality of server controllers 49 that communicate over a suitable communication medium or a combination of communication mediums and that cooperate to process the sensor signals, perform logic, calculations, methods, and/or algorithms, and generate control signals to automatically control features of the vehicle 10.

Figure 2:
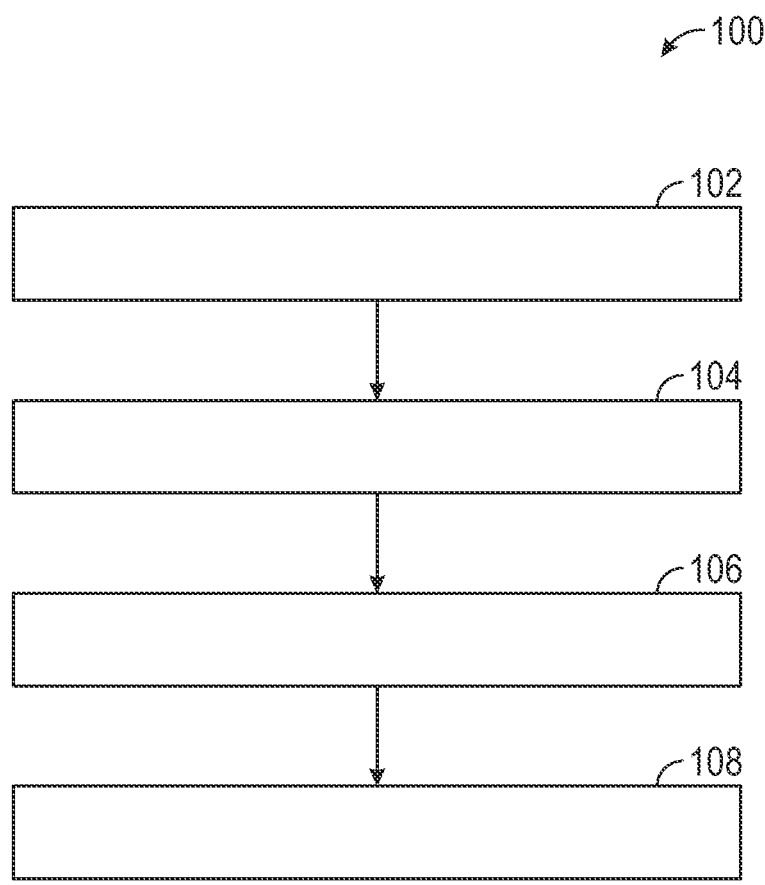
FIG. 2 is a flowchart of a method for performing vehicle computing tasks.

FIG. 2 is a flowchart of a method 100 for performing vehicle computing tasks. The presently disclosed method 100 uses cold standbys in combination with the exchange of the stat information as a safety net on the vehicle 10. By employing this method 100, the computing functions can be executed on the vehicle on or remotely. The method 100 also determines which computing functions to execute and where to execute the functions. The system 98 determines where to perform the computing tasks by considering the vehicle energy consumption/range. Further, the system 98 determines where to perform the computing tasks with the safety net of cold standbys on the vehicle 10, which can take over instantaneously when necessary. Moreover, the overall vehicle energy consumption can be positively influenced by executing the computing functions remotely. It is not only a question as to whether energy is used either on the vehicle 10 or in the remote computing system 48, but also the system 98 can reduce overall energy consumption since computation and cooling systems in server farms of the remote computing system 48 may work more energy efficiently than on vehicles 10.

With continued reference to FIG. 2, the method 100 begins at block 102. At block 102, the vehicle controller 34 determines which vehicle computing tasks need or should be performed to operate the vehicle 10. For instance, the vehicle computing tasks may include, but are not limited to, positioning and mapping, general perception, machine learning, and vehicle-to-everything (V2X) collaborative sensing. Positioning and mapping computing tasks may be offloaded from the vehicle controller 34 to the remote computing system 48 to reduce energy use from the vehicle controller 34 because positioning and mapping computing tasks, such as visual simultaneous localization and mapping (SLAM) computing tasks, are computing intensive. Also, by performing the positioning and mapping computing tasks in the remote computing system 48 instead of in the vehicle controller 34, the positioning accuracy may be improved by leveraging powerful processors in the remote computing systems 48. General perception computing tasks, such as face recognition, backseat kid detection, and pedestrian detection, may be offloaded from the vehicle controller 34 to the remote computing system 48 to reduce energy use from the vehicle controller 34. Most perception computing tasks are performed on a GPU, and GPUs consume much more energy than CPUs during its peak usage. Also, by offloading general perception computing tasks to the remote computing system 48, the perception performance may be improved by using power data center GPUs of the remote computing system 48. The machine learning computing tasks, such as vehicle log data storage, may be offloaded to the remote computing system 48. Offloading machine learning computing tasks to the remote computing system 48 may improve autonomous driving, especially the training process, which is time consuming and energy consuming. The V2X collaborative sensing computing tasks may be offloaded to the remote computing system 48. For example, the perception sensor data may be transmitted from the vehicle 10 to the remote computing system 48. The remote computing system 48 may process the perception sensor data and the situation awareness information may be transmitted from the remote computing system 48 to other vehicles. By performing V2X collaborative sensing tasks in the remote computing system 48, the energy usage in the vehicle 10 may be minimized. Further, performing the V2X collaborative sensing computing tasks in the remote computing system 48 may shorten the processing delays and enhance the active safety system performance. Once the vehicle controller 34 determines which computing tasks need or should be performed, the method 100 continues to block 104.

At block 104, the vehicle controller 34 monitors the wireless connectivity between the vehicle 10 and the remote computing system 48. To do so, the vehicle controller 34 measures, in real time, one or more quality of service (QoS) measurements of the wireless connectivity between the vehicle 10 and the remote computing system 48. A vehicle and cloud connection manager may monitor the availability or quality of the wireless connectivity between the vehicle 10 and the remote computing system 48 via heartbeats, timestamps, and QoS metrics and makes that information available to a vehicle and cloud connection state manager. The vehicle controller 34 may measure the QoS measurements at the link level or the path level. At the link level, the vehicle controller 34 determines the QoS measurements at multiple links from the vehicle 10 to the remote computing system 48. The links may include, but are not limited to, a link between the vehicle 10 and the Radio Access Network Base Station (RAN BS), a link between the RAN BS and the backhaul network, a link between the backhaul network and the remote computing system 48. At the link, the vehicle controller 34 may measure four QoS measurements, namely, link packet drop ratio, link delay, link jitter, and link throughput. The link packet drop ratio may be determined (e.g., calculated) using a low pass filter as shown in the equation below:

$$\tilde{P}(t)=\alpha \times P(t)+(1-\alpha)\times \tilde{P}(t-1)$$

where:

t is time;

P(t) is a new packet drop ratio measurement at sample time t;

$\tilde{P}(t-1)$ is the exponential-average packet drop ratio at time t−1;

$\tilde{P}(t)$ is the exponential-average packet drop ratio at time t; and

α is a weighting factor.

At the link-level, the link delay may be determined (i.e., calculated) using the following equation:

$$\tilde{\tau}(t)=\alpha\times\tau(t)+(1-\alpha)\times\tilde{\tau}(t-1)$$

where:

t is time;

τ(t) is a new link delay measurement sample at time t;

α is a weighting factor;

$\tilde{\tau}(t-1)$ is an exponential-average delay at time t−1; and $\tilde{\tau}(t)$ is the exponential-average delay at time t.

At the link-level, the link jitter may be determined (i.e., calculated) using the following equation:

$$\tilde{\sigma}(t)=\alpha\times\sigma(t)+(1-\alpha)\times\tilde{\sigma}(t-1)$$

where:

t is time;

σ(t) is a new link jitter measurement sample at time t;

α is a weighting factor;

$\tilde{\sigma}(t-1)$ is an exponential-average jitter at time t−1; and $\tilde{\sigma}(t)$ is the exponential-average jitter at time t.

At the link-level, the link throughput may be determined (i.e., calculated) using the following equation:

$$\tilde{T}(t) = \alpha \times T(t) + (1-\alpha) \times \tilde{T}(t-1)$$

where:

t is time;

T(t) is a new link throughput measurement sample at time t;

α is a weighting factor;

$\tilde{T}(t-1)$ is an exponential-average throughput at time t−1; and $\tilde{T}(t)$ is the exponential-average throughput at time t.

As a non-limiting example, the weighting factor above may be 0.3. At the path level, four QoS measurements are being measured along the whole path from the vehicle 10 to the remote computing system 48. At the path-level, the path packet drop ratio may be determined (i.e., calculated) using the following equation:

$$P_{Path}(t) = 1 - \prod_i \left(1 - P_{link}^i(t)\right)$$

where:

t is time;

$P_{Path}(t)$ is the path packet drop ratio at time t; and $P_{link}^i(t)$ is the i_th link level packet drop ratio at time t.

At the path-level, the path delay may be determined (i.e., calculated) using the following equation:

$$\tau_{Path}(t) = \Sigma \tau_{link}^i(t)$$

where:

t is time;

$\tau_{Path}(t)$ is the path delay at time t; and

τ(t) is the i_th link level delay at time t.

At the path-level, the path delay may be determined (i.e., calculated) using the following equation:

$$\sigma_{Path}(t) = \max(\sigma_{link}^i(t))$$

where:

t is time;

$\sigma_{path}(t)$ is the path jitter at time t; and $\sigma_{link}^i(t)$ is the i_th link level jitter at time t.

At the path-level, the path throughput may be determined (i.e., calculated) using the following equation:

$$T_{path}(t) = \min(T_{link}^i(t))$$

where:

t is time;

$T_{path}(t)$ is the path throughput at time t; and $T_{link}^i(t)$ is the i_th link level throughput at time t.

The overall end-to-end wireless pipe QoS indicator is defined as an utility function of path packet drop ratio, path delay, path jitter, and path throughput and may be calculated using the following equation:

$$QoS(t) = U(P_{Path}(t), \tau_{Path}(t), \tilde{\tau}\_path(t), T\_path(t))$$

where:

t is time;

$P_{path}(t)$ is the path packet drop ratio at time t;

$\tau_{path}(t)$ is a path delay at time t;

σ_path(t) is a path jitter at time t;

$\tilde{T}$_path(t) is a path throughput at time t; and

QoS(t) is the overall end-to-end wireless QoS indicator.

After executing block 104, the method 100 proceeds to block 106. At block 106, the vehicle controller 34 determines, among other things, whether one or more vehicle computing tasks will be performed in the vehicle 34 (by the vehicle controller 34) or in the remote computing system 48 by the server controller 49. To do so, the vehicle controller 34 compares the overall QoS indicator with a predetermined connectivity threshold. The predetermined connectivity threshold may be determined through testing. If the overall QoS indicator is greater than the predetermined connectivity threshold, then the vehicle controller 34 determines that all, most, or some of the vehicle computing tasks may be performed in the remote computing systems 48. For example, if the overall QoS indicator is greater than the predetermined connectivity threshold, then the vehicle controller 34 sends inputs, such as sensor data from the sensors 40, to the remote computing system 48, and the vehicle controller 34 receives the results of the computing tasks after the remote computing system 48 has performed the computing tasks. In this case, the vehicle controller 34 configures the functions in the vehicle controller 34 that corresponds to the computing tasks performed in the remote computing system 48 as cold standby backups.

The vehicle controller 34 receives state information from the remote computing system 48 via a vehicle state manager or a remote computing system state manager to enable promotion or demotion of the vehicle functions (e.g., computing tasks) between cold and active. The vehicle or remote computing system state manager takes state-transition decisions for vehicle computing tasks depending on the availability and/or quality of the wireless connectivity between the vehicle 10 and the remote computing system 48. The vehicle state manager communicates state transitions to a vehicle execution manager. The state-transitions decision includes promotions (cold to active) and demotions (active to cold). The vehicle execution manager executes state transitions decisions received from the vehicle state manager by promoting or demoting vehicle computing tasks and uses the state information collected by the vehicle controller 34 when promotion. The vehicle connection manager of the vehicle controller 34 monitors and measures the quality of the wireless connection between the vehicle 10 and the remote computing system 48. The vehicle 10 periodically uploads its state information to remote computing system 48. Different types of state information can be prioritized for upload. There are at least two prioritization strategies. According to the first strategy, the state information uploading frequency may be reversely proportional to QoS indicator as indicated by the following equation: Freq=1/QoS(t), where QoS(t) is the overall QoS indicator at time t, and Freq is the state information uploading frequency. With this strategy, all types of state information are uploaded, but each type has a different frequency, which is calculated with the afore-mentioned equation. According to the second strategy, the state information may be prioritized based on its importance. When QoS indicator is good, all tiers of information are treated equally. However, when QoS indicator is bad, only highest tier(s) enjoys the priority and the remaining is discarded. For example, the most important state information is transmitted while the other 2nd, 3rd, 4th important state information is discarded.

Again, if the overall QoS indicator is greater than the predetermined connectivity threshold, then the remote computing system 48 performs the computing tasks and sends the process state information to the vehicle state manager and the state database (e.g., vehicle non-transitory computer readable storage device or media 46) of the vehicle 10. In this case, the vehicle controller 34 configures the functions in the vehicle controller 34 that corresponds to the computing tasks performed in the remote computing system 48 as cold standby backups. Then, the method 100 proceeds to block 108. At block 108, the server controller 49 of the remote computing system 48 performs the computing tasks and sends the process state information to the vehicle controller 34 in response to determining that the overall QoS indicator is greater than the predetermined connectivity threshold.

If the vehicle controller 34 determines that there is no wireless connectivity between the vehicle 10 and the remote computing system at block 104, then the vehicle controller 34 determines, at block 106, that all of the vehicle computing task should be performed in the vehicle controller 34. In this case, the vehicle connection manager or the connection manager of the remote computing system 48 may observe the loss of wireless connectivity. The vehicle execution manager then promotes cold standby process in the vehicle controller 34 to active using the state information collected from by the vehicle controller 34. Also, the vehicle execution manager of the remote computing system 48 changes the state of the vehicle computing tasks in the remote computing system 48 from active to cold. The vehicle state manager receives the state information from the remote computing system 48 and updates the state in the state database. The connection manager of the vehicle 10 and the remote computing system 48 continues to monitor and measure the quality of the wireless connectivity between the vehicle 10 and the remote computing system 48. Then, at block 108, the vehicle controller 34 performs all of the vehicle computing tasks in response to determining at block 106 that that the vehicle controller 34 should perform the vehicle computing tasks.

If the wireless connectivity is established, the vehicle state manager sends the most recent state information to the state manager of the remote computing system 48. Also, in this case, the vehicle execution manager changes the state of the vehicle functions in the vehicle controller 34 from active to cold. Also, the vehicle execution manager changes the state of the vehicle functions in the remote computing system 48 from cold to active. Also, the vehicle functions (e.g., computing tasks) are performed by the vehicle controller 34.

If the QoS indicator indicated a degraded wireless connectivity at block 104, then the vehicle controller 34 determines, at block 106, that one or more vehicle computing tasks should be performed in the vehicle controller 34 and one or more vehicle computing tasks should be performed in the remote computing system 48. Specifically, if the QoS indicator is equal to or less than the predetermined connectivity threshold at block 104, then the vehicle controller 34 determines, at block 106, that one or more vehicle computing tasks should be performed by the vehicle controller 34 and at least one vehicle computing task should be performed in the remote computing system 48. The connection managers of the vehicle 10 and/or the remote computing system may observe the degradation of wireless connectivity at block 104. Then, the vehicle execution manager promotes some, but not all, the cold standby functions in the vehicle 10 to active using the state information collected by the vehicle controller 34. At least one vehicle computing task in the remote computing system 48 remains active and the corresponding vehicle computing task in the vehicle 10 is set to cold. This configuration limits the amount of state information that needs to be exchanged by means of the degraded connectivity. Then, at block 108, one or more vehicle computing tasks are performed by the vehicle controller 34 and at least one vehicle computing tasks is performed by the remote computing system 48 when the QoS indicator indicates a degraded wireless connectivity.

Further, the power consumption of automated driving compute platforms may heat up the vehicle cabin and result in the need to cool the cabin. However, if the cabin is cold in the winter and the driver turns on the heating, then from an overall energy consumption (i.e., the total energy consumed on the vehicle 10 plus energy consumed on the remote computing system 48) and environmental standpoint, it may be desirable to run the processes (i.e., perform the vehicle computing tasks) on the vehicle 10 to shift in heat dissipation on the vehicle 10 as opposed to on the remote computing system 48.

Figure 3:
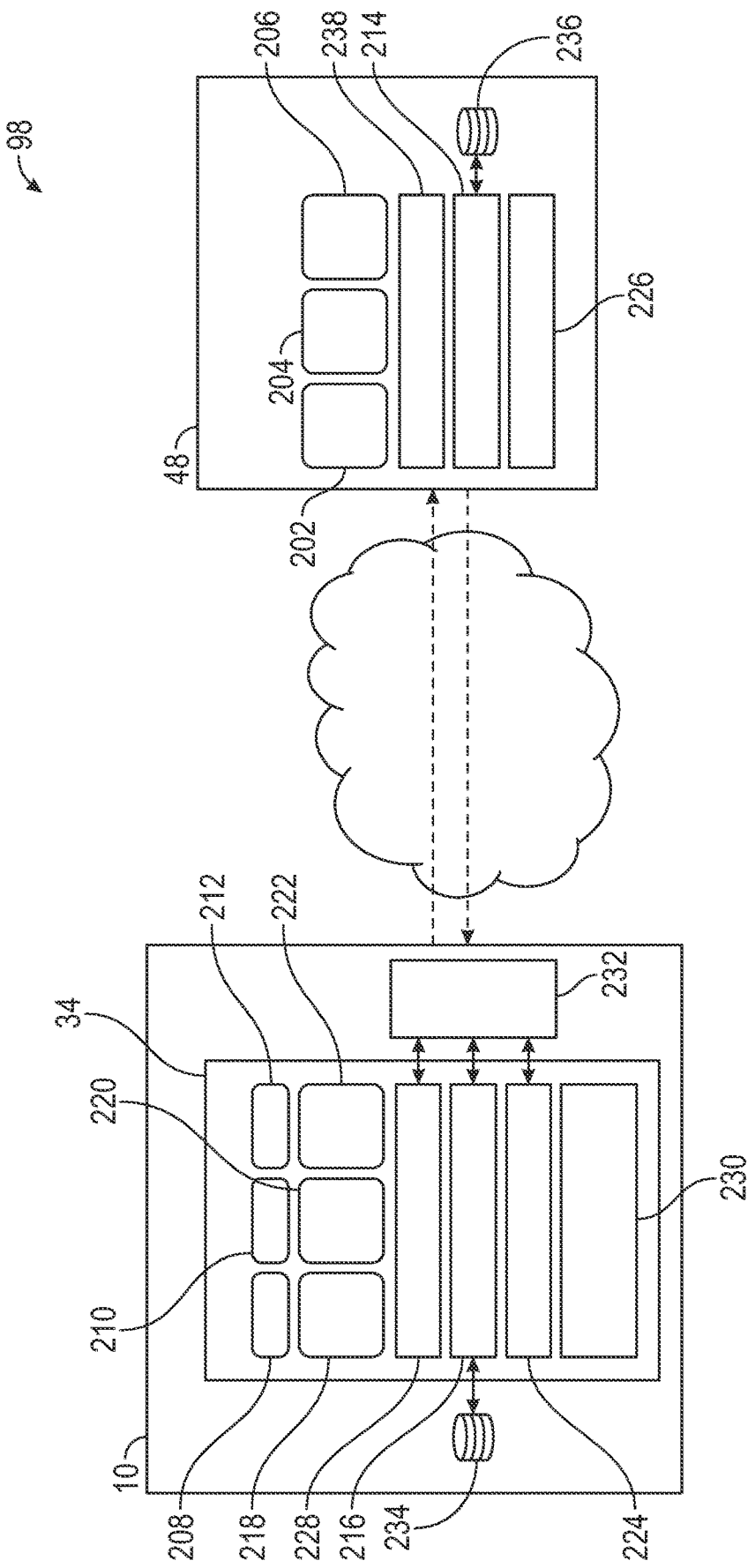
FIG. 3 is a schematic diagram of the system for performing vehicle computing tasks of FIG. 1.

FIG. 3 is a schematic diagram of the system 98 for performing vehicle computing tasks. The system 98 includes the vehicle 10 and the remote computing system 48. The remote computing system 48 may be also called a cloud, edge, or back-office system. The vehicle 10 includes the vehicle controller 34, which may be an electronic control unit. The remote computing system 48 can perform a plurality of critically required computationally expensive vehicle functions 202, 204, 206 that are executed on the remote computing system 48 during normal operation (i.e., when the wireless connectivity between vehicle 10 and the remote computing system 10 is available). The vehicle controller 34 can execute proxy process 208, 210, 212 that forward input data to the remote computing system 48 and receive results of computations from the remote computing system 48. The vehicle controller 34 include cold standby backups 218, 220, and 222 of the critically required computationally expensive vehicle functions 202, 204, 206. The proxy processes 208, 210, and 212 also receive state information from the critically required computationally expensive vehicle functions 202, 204, 206 via the remote state manager 214 and the vehicle state manager 216 required to enable promotion of the cold standby backups 218, 220, and 222 from cold to active.

The vehicle connection manager 224 and the remote connection manager 226 monitor the availability and quality of the connectivity via heartbeats, timestamps, and QoS metrics and makes that information available to the remote state manager 214 and the vehicle state manager 216. The remote state manager 214 and the vehicle state manager 216 take state-transition decisions for the standby backups 218, 220, and 222 of the critically required computationally expensive vehicle functions 202, 204, 206 based on the availability and/or quality of the connectivity. The vehicle state manager 216 communicates state-transition decisions to the vehicle execution manager 228. The possible state-transitions include promotions from cold to active and demotions from active to cold. The vehicle execution manager 228 executes state-transition decisions received from the vehicle state manager 216 by promoting or demoting the cold standby backups 218, 220, and 222.

The vehicle execution manager 228 uses state information collected by the proxy processes 208, 210, and 212 when promotion. The vehicle 10 also includes an operating system and/or a software architecture 230, such as the software architecture sold under the trademark adaptive AUTOSAR. The vehicle 10 also includes a telematics control platform 232 and a vehicle state database 234. The remote computing system 48 also includes a remote state database 236 and a remote execution manager 238.

In some cases, the vehicle connection manager 224 and the remote connection manager 226 observe the loss of wireless connectivity. Then, the vehicle execution manager 228 promotes standby processes 218, 220, and 222 to "active" using state information collected by proxy process 208, 210, 212. The vehicle execution manager 228 changes state of proxy processes 208, 210, 212 from "active" to "cold". The remote execution manager 238 changes state of the critically required computationally expensive vehicle functions 202, 204, 206 from "active" to "cold". The vehicle state manager 216 receives state information from standby processes 218, 220, and 222 and updates state in the vehicle state database 234 and/or the remote state database 236. The vehicle connection manager 224 and the remote connection manager 226 continue monitoring/measuring the connection quality.

In some situations, the vehicle connection manager 224 and the remote connection manager 226 detect that the wireless connection is reestablished and meets QoS requirements. Then, the vehicle state manager 216 sends most recent state information to remote state manager 214. The vehicle execution manager 228 changes state of the cold standby backups 218, 220, and 222 from "active" to "cold". The vehicle execution manager 228 changes state of the proxy process 208, 210, 212 from "cold" to "active". Then, the system 98 starts operating as described above when the wireless connectivity between the vehicle 10 and the remote computing system 48 meets the QoS requirements.

In some situations, the vehicle connection manager 224 and the remote connection manager 226 observe a degradation of wireless connectivity. Then, the vehicle execution manager 228 demotes cold standby backup 222 to a cold standby and promotes the critically required computationally expensive vehicle functions 206 to active. This configuration limits the amount of state information that needs to be exchanged by means of the degraded wireless connectivity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for performing a plurality of vehicle computing tasks, comprising:
   determining the plurality of vehicle computing tasks that need to be performed;
   monitoring a wireless connectivity between a vehicle and a remote computing system, wherein monitoring the wireless connectivity between the vehicle and the remote computing system includes measuring, in real time, at least one quality of service (QOS) measurement of the wireless connectivity between the vehicle and the remote computing system;
   determining whether to perform at least one of the plurality of vehicle computing tasks in at least one of the remote computing system or a vehicle controller of the vehicle based on the at least one QoS measurement; and performing the at least one of the plurality of vehicle computing task in at least one of the remote computing system or the vehicle controller in response to determining to perform at least one of the plurality of vehicle computing tasks in at least one of the remote computing system or the vehicle controller of the vehicle, thereby improving vehicle technology by extending vehicle battery range when the at least one of the vehicle computing tasks is performed by the remote computing system.

2. The method of claim 1, wherein the at least one QoS measurement is one of a plurality of QoS measurements, and the plurality of QoS measurements includes a plurality of link-level QoS measurements and a plurality of path-level QoS measurements.

3. The method of claim 2, wherein the plurality of link-level QoS measurements includes a link packet-drop ratio, a link delay, a link jitter, and a link throughput, and the plurality of path-level QoS measurements includes a path packet-drop ratio, a path delay, a path jitter, and a path throughput.

4. The method of claim 3, wherein monitoring the wireless connectivity between the vehicle and the remote computing system includes determining that there is no wireless connectivity between the vehicle and the remote computing system.

5. The method of claim 4, wherein determining whether to perform at least one of the plurality of vehicle computing tasks in at least one of the remote computing system or the vehicle controller of the vehicle based on the at least one QoS measurement includes determining to perform all of the plurality of vehicle computing tasks in the vehicle controller in response to determining that there is no wireless connectivity between the vehicle and the remote computing system.

6. The method of claim 5, further comprising performing all of the plurality of vehicle computing tasks in the vehicle controller in response to determining to perform all of the vehicle computing tasks in the vehicle.

7. The method of claim 1, wherein the at least one QoS measurement is one of a plurality of QoS measurements, and the plurality of QoS measurements includes a QoS measurement of the wireless connectivity between the vehicle and the remote computing system, and monitoring the wireless connectivity between the vehicle and the remote computing system includes determining the QoS measurement of the wireless connectivity between the vehicle and the remote computing system.

8. The method of claim 7, further comprising determining that the QoS measurement of the wireless connectivity between the vehicle and the remote computing system is equal to or less than a predetermined connectivity threshold, wherein determining whether to perform at least one of the plurality of vehicle computing tasks in at least one of the remote computing system or the vehicle controller of the vehicle based on the at least one QoS measurement includes determining to perform at least one of the plurality of vehicle computing tasks in the vehicle controller and another one of the plurality of vehicle computing tasks in the remote computing system in response to determining that the QoS measurement of the wireless connectivity between the vehicle and the remote computing system is equal to or less than the predetermined connectivity threshold.

9. The method of claim 7, wherein monitoring the wireless connectivity between the vehicle and the remote computing system includes determining that the QoS measurement of the wireless connectivity between the vehicle and the remote computing system is equal to or greater than a predetermined connectivity threshold.

10. The method of claim 9, wherein determining whether to perform at least one of the vehicle computing tasks in the remote computing system or the vehicle controller of the vehicle based on the at least one QoS measurement includes determining to perform all of the plurality of vehicle computing tasks in the remote computing system in response to determining that the QoS measurement of the wireless connectivity between the vehicle and the remote computing system is equal to or greater than the predetermined connectivity threshold.

11. The method of claim 10, wherein performing the at least one of the plurality of vehicle computing task in at least one of the remote computing system or the vehicle controller includes performing all of the plurality of vehicle computing tasks in the remote computing system in response to determining that the QoS measurement of the wireless connectivity between the vehicle and the remote computing system is equal to or greater than the predetermined connectivity threshold.

12. The method of claim 11, wherein the plurality of vehicle computing tasks includes positioning and mapping, perception, machine learning, and vehicle-to-infrastructure (V2X) sensing.

13. The method of claim 1, wherein the at least one QoS measurement is a first QoS measurement, the first QOS measurement is part of a plurality of QoS measurements, and the plurality of QOS measurements includes plurality of link-level QoS measurements, and at least one of the plurality of link-level QoS measurements is a link packet drop ratio, and the link packet drop ratio is calculated using a following equation:

$$\tilde{P}(t)=\alpha \times P(t)+(1-\alpha) \times \tilde{P}(t-1)$$

where:
t is time;
P(t) is a new packet drop ratio measurement at sample time t;
$\tilde{P}(t-1)$ is an exponential-average packet drop ratio at time t−1;
$\tilde{P}(t)$ is an exponential-average packet drop ratio at time t; and
α is a weighting factor.

14. A system for performing a plurality of vehicle computing tasks, comprising:
a vehicle including a vehicle controller;
a remote computing system including a server controller, wherein the server controller is configured to be in wireless communication with the vehicle controller;
wherein vehicle controller is programmed to:
determine the plurality of vehicle computing tasks that need to be performed;
monitor a wireless connectivity between a vehicle and a remote computing system by measuring, in real time, at least one quality of service (QoS) measurement of the wireless connectivity between the vehicle and the remote computing system;
determine whether to perform at least one of the plurality of vehicle computing tasks in the remote computing system or the vehicle controller based on the at least one QoS measurement; and
in response to determining to perform the at least one of the plurality of vehicle computing tasks in the remote computing system or the vehicle controller, perform the at least one of the plurality of vehicle computing task or command the server controller to perform the at least one of the plurality of vehicle computing task, thereby improving vehicle technology by extending vehicle battery range when the at least one of the vehicle computing tasks is performed by the remote computing system.

15. The system of claim 14, wherein the at least one QoS measurement is a one of a plurality of QOS measurements, and the plurality of QoS measurements includes a plurality of link-level QoS measurements and a plurality of path-level QoS measurements, the plurality of link-level QoS measurements include a link packet drop ratio, a link delay, a link jitter, and a link throughput for each link between the vehicle and the remote computing system, and the plurality of path-level QoS measurements includes a path packet-drop ratio, a path delay, a path jitter, and a path throughput.

16. The system of claim 15, wherein the vehicle controller is programmed to determine that there is no wireless connectivity between the vehicle and the remote computing system using the plurality of QOS measurements.

17. The system of claim 15, wherein the vehicle controller is programmed to perform all of the plurality of vehicle computing tasks in response to determining that there is no wireless connectivity between the vehicle and the remote computing system.

18. The system of claim 14, wherein the at least one QoS measurement is one of a plurality of QoS measurements, and the plurality of QoS measurements includes a QoS measurement of the wireless connectivity between the vehicle and the remote computing system, and the vehicle controller is programmed to determine a QoS measurement of the wireless connectivity between the vehicle and the remote computing system.

19. The system of claim 18, wherein the plurality of vehicle computing tasks includes a first vehicle computing task and a second vehicle computing task, and the vehicle controller is programmed to:

compare the QOS measurement of the wireless connectivity between the vehicle and the remote computing system with a predetermined connectivity threshold to determine whether the QoS indicator is equal to or less than the predetermined connectivity threshold;

determine that the QoS measurement of the wireless connectivity between the vehicle and the remote computing system is equal to or less than the predetermined connectivity threshold; and in response to determining that the QoS measurement of the wireless connectivity between the vehicle and the remote computing system is equal to or less than the predetermined connectivity threshold, perform the first vehicle computing task; and wherein the server controller is programmed to perform the second vehicle computing task in response to determining that the QoS measurement of the wireless connectivity between the vehicle and the remote computing system is equal to or less than the predetermined connectivity threshold.

20. The system of claim 18, wherein the vehicle controller is programmed to:

compare the QOS measurement of the wireless connectivity between the vehicle and the remote computing system with a predetermined connectivity threshold to determine whether the QoS measurement of the wireless connectivity between the vehicle and the remote computing system is greater than the predetermined connectivity threshold; and determine that the QoS measurement of the wireless connectivity between the vehicle and the remote computing system is greater than the predetermined connectivity threshold; and wherein the server controller is programmed to perform all of the plurality of vehicle computing tasks in response to determining that the QoS measurement of the wireless connectivity between the vehicle and the remote computing system is greater than the predetermined connectivity threshold.

* * * * *